US006866357B1

(12) United States Patent
Stehle

(10) Patent No.: US 6,866,357 B1
(45) Date of Patent: Mar. 15, 2005

(54) METHOD FOR CONTROLLING PRESSURE NOZZLES OF A FULL-LINE PRINTING HEAD IN AN INKJET PRINTER FOR PRINTING DIGITAL PHOTOGRAPHIC IMAGES

(76) Inventor: Kurt Stehle, Kodak Aktiengesellschaft, 70323 Stuttgart (DE)

(*) Notice: Subject to any disclaimer, the term of this patent is extended or adjusted under 35 U.S.C. 154(b) by 534 days.

(21) Appl. No.: 09/670,146

(22) Filed: Sep. 26, 2000

(30) Foreign Application Priority Data

Oct. 1, 1999 (DE) .......................................... 199 47 419

(51) Int. Cl.[7] .......................... B41J 29/38; G02B 27/28; G02B 5/30

(52) U.S. Cl. .......................................... 347/13; 358/488

(58) Field of Search ................................ 347/13, 5, 16; 358/406, 488, 504, 505, 1.12

(56) References Cited

U.S. PATENT DOCUMENTS

| | | | | |
|---|---|---|---|---|
| 5,812,162 A | | 9/1998 | Silverbrook | 347/58 |
| 5,847,674 A | * | 12/1998 | Paroff et al. | 347/33 |
| 5,912,448 A | * | 6/1999 | Sevier et al. | 235/454 |
| 6,027,203 A | * | 2/2000 | Campbell | 347/42 |
| 6,109,745 A | * | 8/2000 | Wen | 347/101 |

FOREIGN PATENT DOCUMENTS

| | | | |
|---|---|---|---|
| EP | 0 570 167 A2 | 11/1993 | B41J/2/205 |
| WO | WO 96/38370 | 12/1996 | B65H/23/02 |
| WO | WO 97/28003 | 8/1997 | B41J/13/08 |

* cited by examiner

*Primary Examiner*—Stephen D. Meier
*Assistant Examiner*—Alfred E. Dudding
(74) *Attorney, Agent, or Firm*—Milton S. Sales

(57) ABSTRACT

The invention concerns a method for controlling print nozzles of a full-line printing head in an inkjet printer for printing digital photographic images, in which, in order to prevent any image printing extending beyond the edge of a recording medium, the edge position of the recording medium that is moved relative to the printing head is sensed by way of a CCD line sensor, and ink droplets are discharged toward a recording medium, by way of the printing nozzles, in order to produce image pixels. The method is characterized by the following steps: storage of the edge position of the recording medium, scanned for each CCD line, as digital data in a memory of an electronic control system; generation of a digital printing mask by determining, for each CCD line, the image pixel difference between the digital data of the recording medium representing the edge position, and the digital image data, stored for each CCD line, that are provided for printing out onto the recording medium; and creating a control signal, for each CCD line, corresponding to the printing mask, in order to deactivate the printing nozzles that discharge ink droplets beyond the edges of the recording medium.

4 Claims, 2 Drawing Sheets

METHOD FOR CONTROLLING PRESSURE NOZZLES OF A FULL-LINE PRINTING HEAD IN AN INKJET PRINTER FOR PRINTING DIGITAL PHOTOGRAPHIC IMAGES

FIELD OF THE INVENTION

The invention concerns a method for controlling print nozzles of a full-line printing head in an inkjet printer for printing digital photographic images, in which, in order to prevent any image printing extending beyond the edge of a recording medium, the edge position of the recording medium that is moved relative to the printing head is sensed by way of a CCD line sensor, and ink droplets are discharged toward a recording medium, by way of the printing nozzles, in order to produce image pixels.

BACKGROUND OF THE INVENTION

The use of inkjet printers for the production of paper proofs of digital photographic images is known, for example, from PCT Application WO 97/28003. One particular problem encountered in this context is that when a full-bleed paper proof is produced by printing over the sides of the recording medium, ink gets onto the transport substrate, for example a transport belt or transport roller. The ink consequently becomes smeared onto the backside of the next paper proof being printed, so that the printout becomes unusable. In addition, the deposits of ink residues can eventually result in paper transport malfunctions in the printer.

To regulate the lateral position of a material web, it is known from PCT Application WO 96/38370 that the lateral position of web edges is sensed, in the context of processing of continuous paper webs, by way of a CCD sensor, in which light beams reflected from a region on either side of the web edge strike a CCD line extending perpendicular to the travel direction of the material web. The voltage signals thereby produced, which are analogous to the illumination intensity, are displaced along the CCD line using a shift clock cycle; at the output, they are picked off individually and compared [in] at least one comparator to an adjustable threshold value. If deviations from a setpoint exist, a correction signal is generated that triggers, via an electronic control system, an actuating signal for regulating the lateral position of the material web.

Also known, from European Patent 0 570 167 A2, is a method for controlling the print density of an inkjet printer in which first a predefined printed line width is selected, the printing medium is positioned under the printing head, and then a line is printed. The width of the printed line is sensed by way of an optical sensor, and the difference between the predefined and printed widths is determined.

The known existing art cited above thus discloses only solutions for controlling or positioning printing media or recording media relative to a printing head. A digital printing method for the production of photo proofs that avoids the aforesaid problems and costs associated with print production is not known.

It is the object of the invention to describe a method for controlling printing nozzles of a full-line printing head in an inkjet printer with which printing beyond the edge of a printing medium can be prevented.

SUMMARY OF THE INVENTION

According to the present invention, the object is attained by the features of claim 1. Especially by the fact that a digital printing mask representing the recording medium is generated, and is placed onto the digital image that is about to be printed, perfect full-bleed proofs can be produced without reducing the printing speed, so that the method according to the present invention meets the needs of commercial lab operations. The carryover of ink residues can thus also be prevented, as can ink deposits on transport mechanisms in a printer in which the method according to the present invention is utilized. The result is that printer maintenance is also greatly simplified.

BRIEF DESCRIPTION OF THE DRAWINGS

The invention is explained below in more detail with reference to an exemplary embodiment depicted in the drawings, in which.

DETAILED DESCRIPTION OF THE INVENTION

Figure 1:
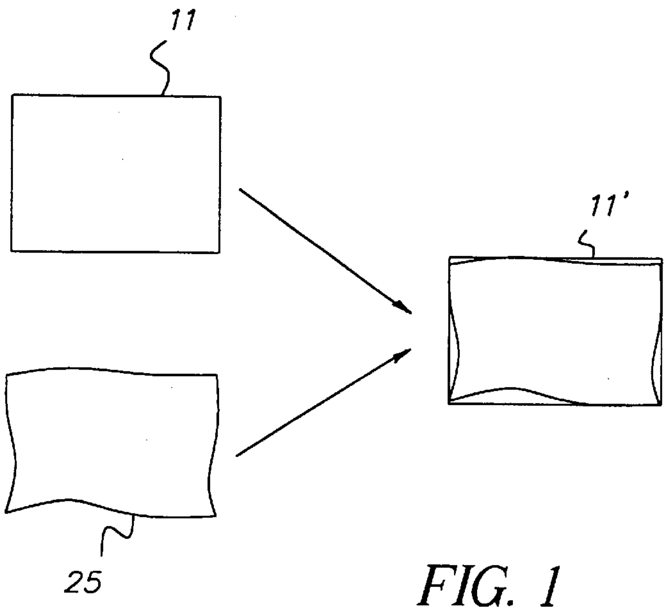
FIG. 1 shows a schematic depiction of the method according to the present invention.
Figure 2:
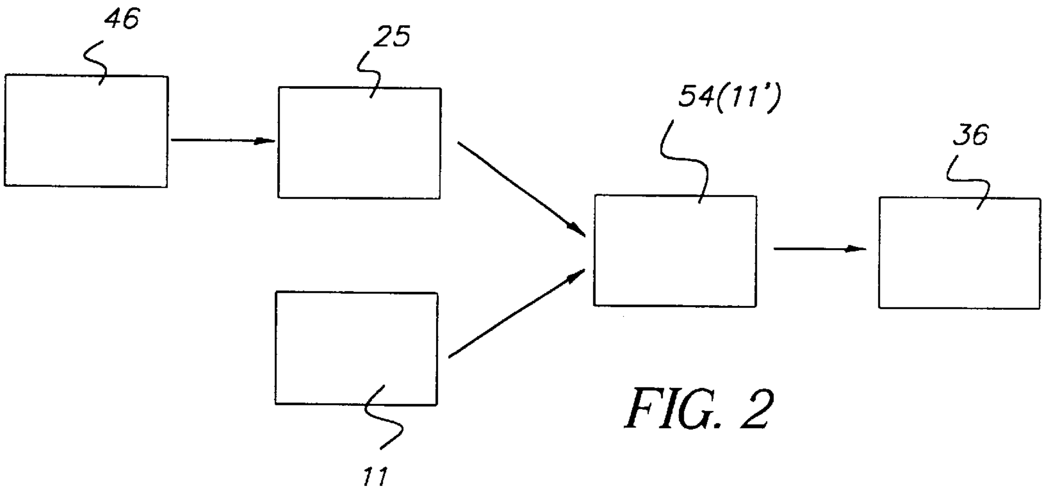
FIG. 2 shows a schematic depiction of the means used to carry out the method according to the present invention.
Figure 4:
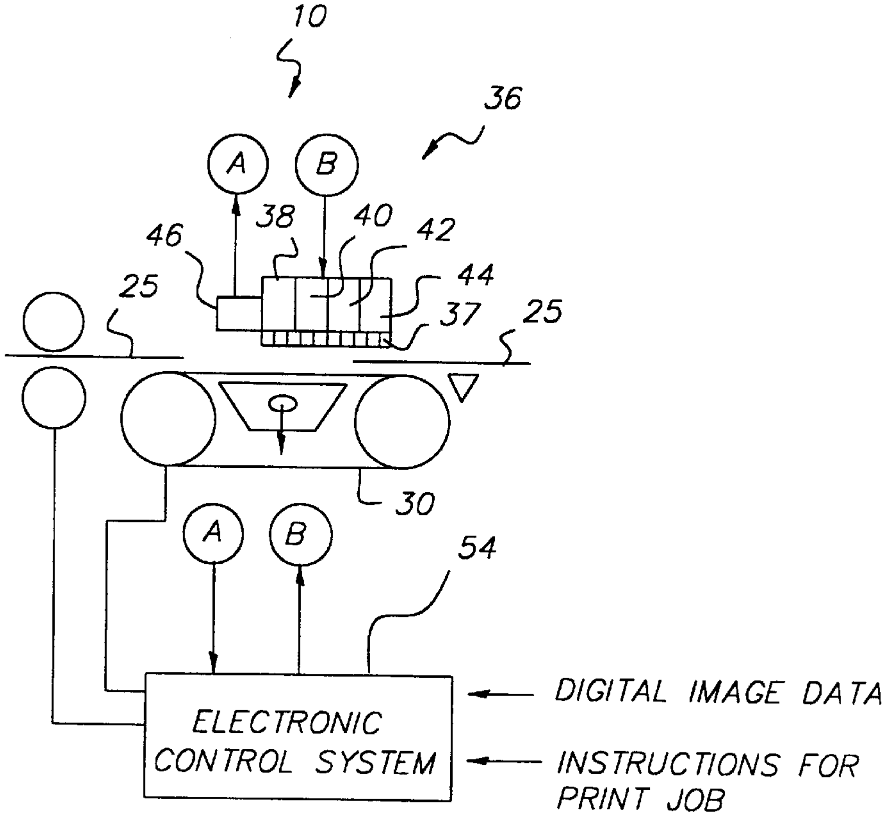
FIG. 4 shows a schematic partial view of an inkjet printer in which the method according to the present invention is being used.

As shown in the schematic depiction of FIG. 1, an image to be printed is labeled with the reference character 11. Printing is performed by an inkjet printer 10 as described in detail in copending U.S. patent application Ser. No. 09/596,935 and depicted in a partial view in FIG. 4, which has a "full-line" color printing head 36 having a plurality of printing head elements 38, 40, 42, 44, equipped with printing nozzles 37, that are each supplied with ink of a different color, e.g. cyan, magenta, yellow, and black. Color printing head 36 is arranged above a transport belt 30 of printer 10, and extends over the entire width of the transport belt. Printing head 36 is, for example, an inkjet printing head of the kind described in U.S. Pat. No. 5,812,162. To control the operation of printer 10, the various components (not depicted) of the printer are connected to an electronic control system 54 having a digital processor, for example a microcomputer. Electronic control system 54 receives from an input unit, for example a film scanning station or a digital image processing station (not depicted), or via a host computer, the digital image data for printing image 11 and/or other instructions for the print job.

With the method according to the present invention, a sheet-shaped recording medium, comprising a specially surface-treated photographic ink-jet printing paper having a weight of preferably 200 to 300 $g/m^2$ (although other weights can be used), is scanned using a CCD line sensor 46 that is arranged directly in front of printing head 36. This senses all four edges of the cut sheet of recording medium 25 when the latter is transported by transport belt 30 of inkjet printer 10 under printing head 36; preferably, printing head 36 and the stored image 11 that is to be printed are a little wider than the cut sheet of recording medium 25.

Figure 3:
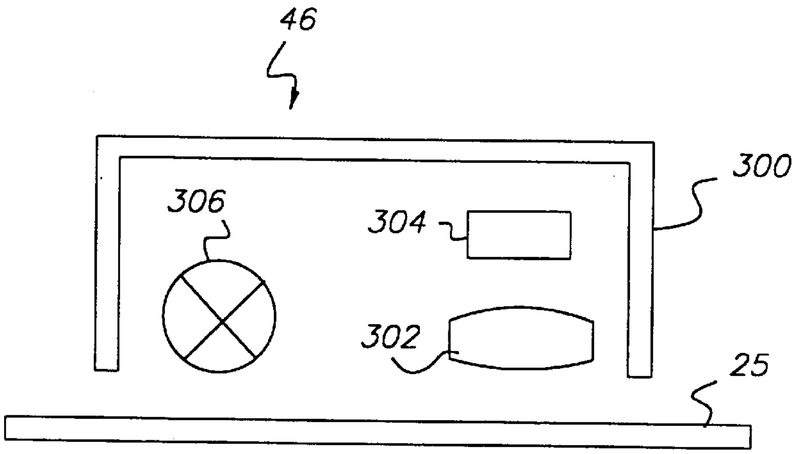
FIG. 3 shows a schematic depiction of an image sensor for carrying out the method according to the present invention.

CCD line sensor 46 senses a line that is slightly wider than recording medium 25. FIG. 3 depicts an example of a suitable linear sensor arrangement. CCD sensor 46 has a housing 300, a lens 302 for focusing an image of the paper and of the conveyor belt onto an image sensor module 304, and a light source 306 for illuminating the paper on the transport belt. A suitable image sensor module 304 is, for example, the ILX533K linear CCD color image sensor marketed by Sony Corporation. The sensor that is used has 2700 pixels. Imaged with the optical system onto, for example, DIN A4 width, this corresponds to a resolution of 300 dpi (dots per inch). An example of such an arrangement is described in published PCT Application 96/38370. Sensors having more than 10,000 pixels can, of course, also be used for higher resolution or greater scanning widths.

The light that is reflected from recording medium 25 and strikes CCD line sensor 46 generates, in the CCD line comprising a plurality of pixels, analog signals in the form of charge packets; these are displaced, for example by way of a clock pulse generator connected in electronic control system 54 and having a preferred clock frequency of up to 4 MHz, to the output of the line as analog output voltage signals, even higher clock rates being necessary for even higher printing speeds. The CCD line thus scans recording medium 25 in its edge region, line by line, as it passes by, and continuously furnishes analog voltage signals in accordance with the shift clock cycle. These signals are then digitized by an A/D converter and stored in a memory of electronic control system 54. Advantageously, a data compression of the acquired signals to an 8-bit gray scale should be performed. In principle, a conversion using two values (black and white) is in fact sufficient for exact determination of the edges of the recording medium, but certain artifacts caused by the transport belt, such as scattered light, reflections, etc. can be better differentiated from the paper using an 8-bit conversion. The digitized signals are compared to a threshold value, so that, for example, the signals representing image pixels that lie below the threshold value are characterized as 0, i.e. no recording medium is present, and the signals that lie above the threshold value are characterized as 1. The position of the edge of recording medium 25 can be determined, in known fashion, by determining or counting the corresponding clock cycle by way of a clock cycle counter. The digital "paper mask" thus produced, which corresponds to the actual area of recording medium 25, is then converted by way of a microcomputer present in electronic control system 54 into the resolution of the printing head of the ink-jet printer, and compared to the digitized and stored image 11 (both now having the same resolution) using a simple logical AND function by way of AND gates. As already mentioned earlier, the area of recording medium 25 is slightly smaller than the area of the stored image 11. The production of a digital printing mask can thus be depicted as follows in terms of resulting pixels:

Image pixels: 1100 1111 0101 . . .

Mask pixels 0000 0011 1111 . . .

Resulting pixels 0000 0011 0101 . . .

Since the resolution of the printing head for producing a printed image, and that of the aforesaid digital printing mask, are identical, it is possible to deactivate those printing nozzles 37 of the printing head that would produce image pixels outside the area of recording medium 25. This is done by the fact that electronic control system 54 creates, for each printing nozzle 37 and printing line, a control signal that, for example, suppresses a heating pulse for ink discharge by the printing nozzle.

PARTS LIST

10 Inkjet printer
11 Stored image to be printed
11' Printing mask
25 Recording medium
28 Conveying roller
30 Transport belt
33 Vacuum suction plate
36 Full-line color inkjet printing head
37 Printing nozzles
38 Printing head element
40 Printing head element
42 Printing head element
44 Printing head element
46 Image sensor/CCD line sensor
54 Electronic control system
300 Housing
302 Lens
304 Image sensor module
306 Light source

What is claimed is:

1. A method for controlling print nozzles of a full-line printing head in an inkjet printer for printing digital photographic images, in which, in order to prevent any image printing extending beyond the edge of a recording medium, the edge position of the recording medium that is moved relative to the printing head is sensed by way of a CCD line sensor, and ink droplets are discharged toward a recording medium, by way of the printing nozzles, in order to produce image pixels, the method comprising:

storage of the edge position of the recording medium, scanned for each CCD line, as digital data in a memory of an electronic control system;

generation of a digital printing mask by determining, for each CCD line, the image pixel difference between the digital data of the recording medium representing the edge position, and the digital image data, stored for each CCD line, that are provided for printing out onto the recording medium; and creating a control signal, for each CCD line, corresponding to the printing mask, in order to deactivate the printing nozzles that discharge ink droplets beyond the edges of the recording medium.

2. The method as defined in claim 1, wherein in the absence of stored digital image data that are provided for printing out onto the recording medium, all the printing nozzles of the printing head are deactivated.

3. The method as defined in claim 1, wherein scanning of the edge position of the recording medium is accomplished with a resolution of 300 to 600 dpi (dots per inch).

4. The method as defined in claim 1, wherein the size of the image to be printed exceeds that of the recording medium.

* * * * *